US005224743A

United States Patent [19]

Dawdy et al.

[11] Patent Number: 5,224,743

[45] Date of Patent: Jul. 6, 1993

[54] LOCKING MECHANISM FOR REFUSE CONTAINER

[75] Inventors: Steven Dawdy, Howell; Peter J. Rosewig, Jr., Dexter, both of Mich.

[73] Assignee: E.S. Avalon Company, Whitmore Lake, Mich.

[21] Appl. No.: 879,048

[22] Filed: May 6, 1992

Related U.S. Application Data

[63] Continuation-in-part of Ser. No. 647,807, Jan. 30, 1991.

[51] Int. Cl.[5] ........................ E05C 3/14; B65G 65/34

[52] U.S. Cl. ................................ 292/228; 294/68.26; 414/411; 267/177

[58] Field of Search ............... 292/230, 231, 246, 237, 292/228, 259; 294/68.26; 220/315, 908; 414/411, 414, 408; 267/177, 175

[56] References Cited

U.S. PATENT DOCUMENTS

| | | | |
|---|---|---|---|
| 973,641 | 10/1910 | Dysart | 267/177 |
| 4,155,584 | 5/1979 | Pracchia | 414/414 |
| 4,182,530 | 1/1980 | Hodge | 294/68.26 |
| 5,042,856 | 8/1991 | Goodman | 294/68.26 |
| 5,090,753 | 2/1992 | Goodman | 292/230 |
| 5,094,358 | 3/1992 | Serio, Sr. | 220/315 |
| 5,118,000 | 6/1992 | Howell et al. | 220/322 |

*Primary Examiner*—Renee S. Luebke
*Assistant Examiner*—D. Boucher
*Attorney, Agent, or Firm*—Dykema Gossett

[57] ABSTRACT

A lock assembly allows selective locking of a refuse container so that it cannot be manually opened by an unauthorized user, but can be opened automatically by a refuse collection truck when the container is to be emptied. The lock assembly has a locking bar that is attached to a control bar which is pivotally mounted to the refuse container. In one embodiment, the control bar is selectively connected to a spring such that when the container is to be locked, the control bar and locking bar are connected to the spring by a lock and in order to open the container the bias of the spring must be overcome. The spring is set such that this bias is easily overcome by engagement of the coupler of a refuse collection truck. When the lock is removed, the control bar is separated from the spring and the locking bar freely rotates. In another embodiment, the locking bar is connected to a spring bias control bar by articulated connecting members. These members can be locked together by a lock so that the locking bar can only be moved by overcoming the spring bias applied to the control bar. When the lock is removed, the locking bar is free to pivot through the articulated connecting members with respect to the control bar.

12 Claims, 4 Drawing Sheets

FIG 3
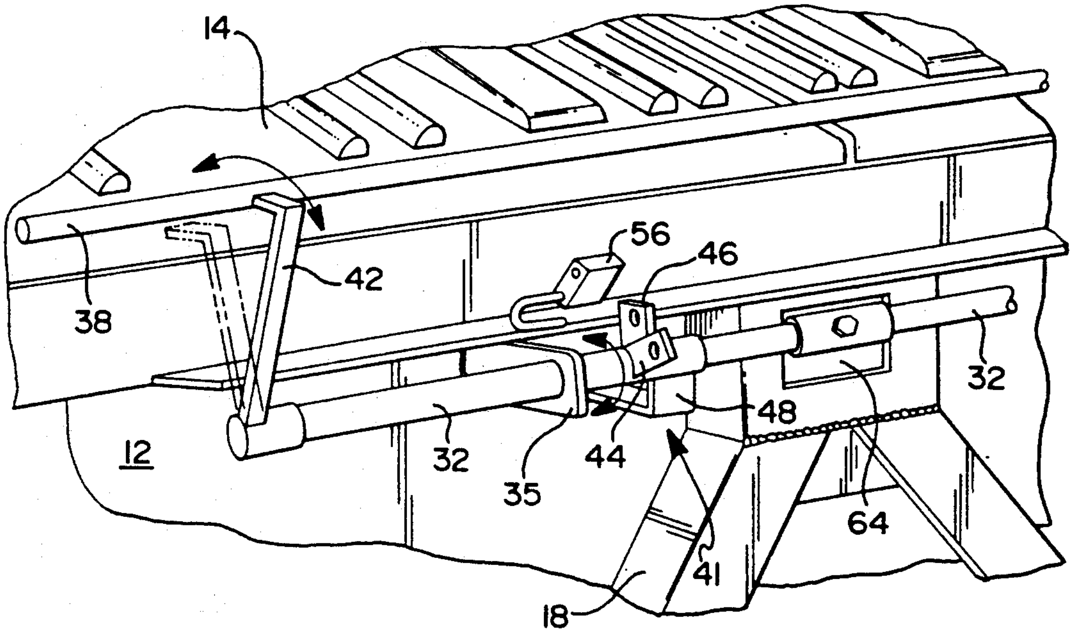
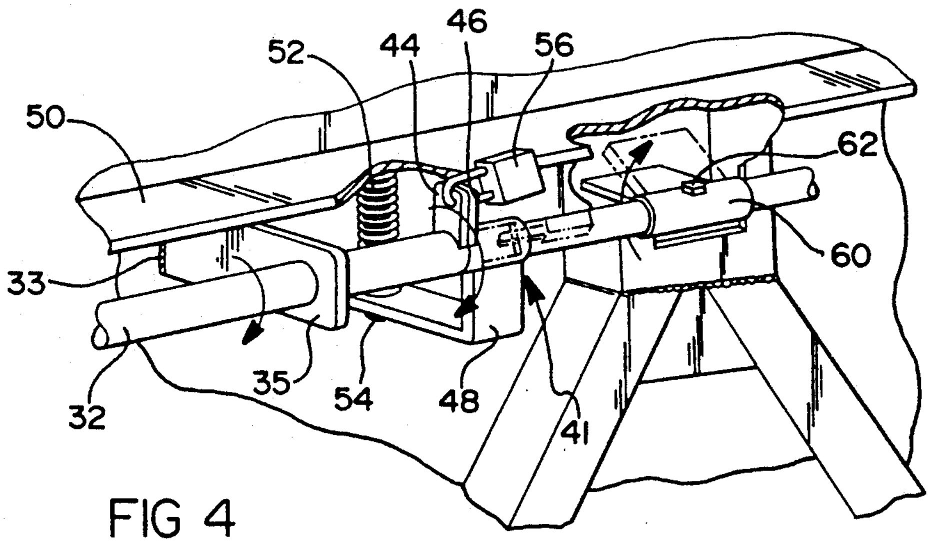
FIG 4

FIG 7
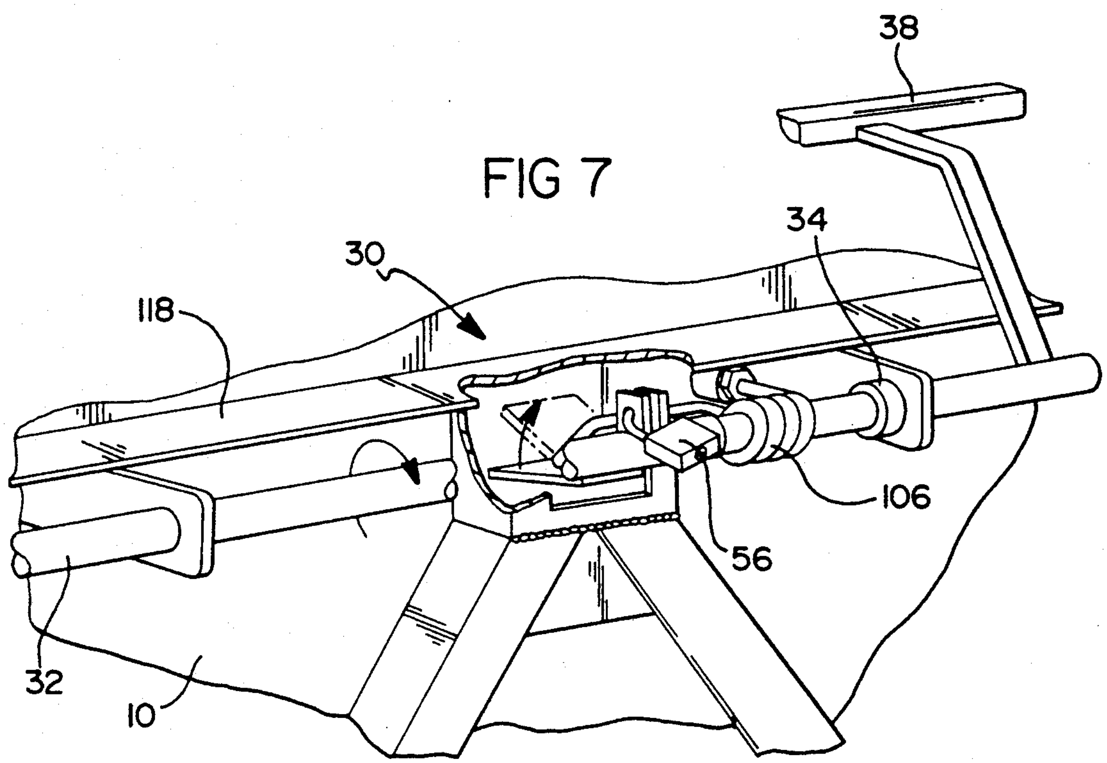
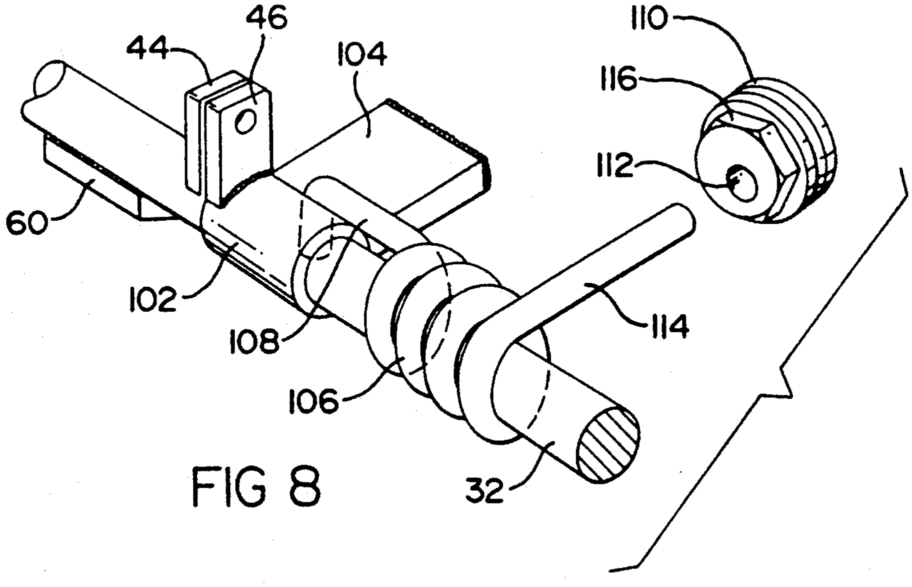
FIG 8

LOCKING MECHANISM FOR REFUSE CONTAINER

This application is a continuation-in-part of Ser. No. 07/647,807, filed Jan. 30, 1991.

BACKGROUND OF THE INVENTION

The present invention relates to a locking assembly for a typical refuse container which has a receptacle for receiving refuse and a hinged lid that covers the receptacle. The locking assembly locks the lid so that it cannot be manually opened by an unauthorized user, but can be opened automatically by a refuse collection truck when the container is being emptied.

A continuing problem for users of refuse containers is the unauthorized use of their container. The cost of a container is directly related to the number of times the container has to be dumped. Thus, if others are using the container they fill it more quickly and increase the cost of the container.

In order to keep others from using the container, various methods have been employed to lock the container. One method is to wrap chains around the container and lock the chains. With this method, the only way to open the lid is to have a key to unlock the lock and remove the chains. This technique is cumbersome for the user and is bad for the refuse collector. The collector must have a key and when it is time to dump the container, he must get out of his truck and unlock the lock. With several users employing this method the collection truck operator has to keep a collection of keys properly organized and leave the truck numerous times during a route. This dramatically slows the collection process.

U.S. Pat. No. 4,155,584 issued to Pracchia on May 22, 1979, is one attempt to overcome the above problems and still provide a lock for a storage container that does not require the operator of a collection truck to leave the vehicle when the container is to be dumped. Pracchia incorporates a security locking mechanism located completely within the container which is actuated only when the container is turned over.

In one embodiment of Pracchia, a weight is mounted to pivot by gravity through a circular path when the unit is tilted. A hammer carried by the weight strikes an anvil on a crank arm which operates through a toggle connecting link to pivot a locking lever. A detent on the locking lever is moved out of engagement with a perimeter frame which is pivotally mounted on the open end of the container. A closure lid which is independently locked to the frame swings open with the frame for discharging the contents.

In another embodiment a weight is moved by gravity through an arc to strike and pivot a detent arm which normally retains a larger second weight. The second weight then moves by gravity along a linear path towards the end of a tube where it strikes and pivots a locking lever. The lever then moves a detent out of engagement with a perimeter frame which it then is free to swing open with the closure lid for dumping the contents.

A disadvantage of Pracchia is the cost of such a unit. Because of the complicated linkage mechanism employed, it appears to be an expensive refuse collection unit. Additionally, the various moving components would need to be maintained, particularly because the mechanism is operated by gravity which requires the components to move freely. Regular maintenance would have to be performed in order to ensure proper operation. Still further, the unit would not function well with a unit having a plastic lid as is typical of modern receptacles. Pracchia discloses a slot 60 formed in the outer margin of the lid which closes about a staple 62 mounted above the outer angle of the frame so that a padlock can be mounted through the staple for independently locking the lid of the frame. With a plastic lid, an unauthorized user could easily force the lid past the staple and the lock to use the container.

U.S. Pat. No. 4,182,530 issued to Hodge on Jan. 8, 1980 discloses a further attempt at providing a lock for a storage container which does not require the operator of a collection truck to unlock the container when the container is dumped. Hodge discloses a commercial trash bin which has lids provided with a special latch that is disabled to permit dumping through gravity action when the trash bin is lifted, inverted and dumped. In one embodiment the mechanism employs a heavy spring which is compressed by the weight of the trash bin, and in another embodiment a gravity operated latch releasing mechanism is employed. In each, to open the trash bin while it is in the upright orientation, a key-operated release, either in the form of a padlock or a built-in lock mechanism, is used.

One disadvantage of Hodge is that the locking assembly must be made of heavy gauge steel because it supports the weight of the container when the container is being dumped. As illustrated, the latch mechanism pivots on a lateral pivot rod. When the trash container is being dumped, the weight of the container rests upon plate 34 of the latch mechanism with the latch mechanism pivoting about the single lateral pivot rod. If the container is misaligned at all during the dumping process, tremendous stress could be exerted on the pivot rod and unless heavy gauge material is used, it could damage if not destroy the rod and the locking mechanism. Further, the pivot rod would have to be maintained regularly in order to ensure that it works properly. If the rod were to stick due to a build-up of corrosion, the forces would be transmitted again to the pivot rod and again possibly damage or even destroy the locking mechanism. Another disadvantage of Hodge is that the arrangement allows a pry bar to be used to open the container. The upper portion of the locking mechanism is very close to the front face of the container allowing a pry bar to be inserted to pry open the lock assembly to open the lid.

BRIEF SUMMARY OF THE INVENTION

The lock assembly of the present invention overcomes the above problems. In the preferred embodiment, the lock assembly has a locking bar that is attached to a control bar which is pivotally mounted to a refuse container. The locking bar is adjacent the lid of the refuse container and has two positions. The first position is the locking position wherein it engages the lid so that the lid cannot be opened and the second position is the unlocked position wherein it is spaced from the lid so that the lid can be opened. The control bar has a locking fixture on it that is spring biased. When the locking fixture is engaged, the locking bar cannot be manually pivoted, but it can be pivoted by the force of a collection truck boom. When the lock is disengaged, the locking bar can be manually pivoted. The lock can only be disengaged by using a key which is controlled by an authorized user.

The disclosed lock fixture of this embodiment employs a pair of collars mounted on the control bar. One collar is mounted so that the control bar is free to rotate within the collar. This collar has a flange extending outwardly from it that is mounted to a spring which is in turn mounted to the receptacle. The other collar is fixedly mounted to the control bar and rotates with the control bar. Each of these collars are closely adjacent one another and have apertured tabs extending from them. These apertured tabs are adapted to receive a locking means, such as a padlock. When the tabs are joined by the lock, the movement of the control bar is resisted by the bias of the spring acting through the one collar. As should be appreciated, the amount of force necessary to pivot the control bar will equal the spring force. By using a stiff spring, the force of the collection truck boom will be required to pivot the control bar. When the lock is removed, the spring biased collar is separated from the other collar and the locking and control bars are free to rotate so the lid can be opened.

In a further embodiment of this invention, the lock assembly employs a control bar that is similarly journaled to the refuse container so that it rotates with respect to the container. The locking bar is pivotally mounted with respect to the control bar so that it is rotatable with respect to the control bar and with respect to the container. The locking bar has a first position which engages the lid to lock the container and a second position spaced from the lid to allow the container to be opened. A locking means is provided for locking the locking bar in the first position with respect to the control bar. When locked in the first position, the locking bar only rotates with respect to the container in response to rotation of the control bar. As in the previous embodiment, the control bar is biased by a heavy spring so that it can only be moved by the boom of a refuse collection truck. In this way, when the locking bar is locked to the control bar, the only way to open the refuse container is to overcome the bias of the spring.

In this embodiment, the locking bar is pivotally connected to the control bar by articulated connectors. There are two connectors extending outwardly from the locking bar in the direction of the control bar and two connectors extending outwardly from the control bar in the direction of the locking bar. Each connector extending from the locking bar is pinned to a respective connector extending from the control bar so the locking bar can pivot with respect to the control bar about these pins. Apertures are formed in at least one of the pinned connectors to receive a locking means, such as for example a padlock.

When an authorized user wants to use the refuse container, the user can remove the lock from the articulated connectors, and rotate the locking bar to free the lid so that it can be opened. When the lock is in place, the locking bar is fixed to the control bar and can only be moved when enough force to overcome the spring force is applied to the control bar. Preferably, the spring force is much greater that what an individual could exert, but less than the force of a boom when it engages the container.

In this way, the refuse container can be locked by selectively locking the locking bar to the biasing means so that movement of the locking bar to the open position requires sufficient force to overcome the biasing means.

BRIEF DESCRIPTION OF THE DRAWINGS

FIG. 3 is a further partial perspective view of FIG. 1.

FIG. 4 is a partial perspective view of the locking assembly and engagement means of the present invention.

FIG. 7 is a partial perspective view of a third embodiment locking assembly of the present invention.

FIG. 8 is a detailed view of the embodiment illustrated in FIG. 7.

DETAILED DESCRIPTION OF THE INVENTION

Figure 1:
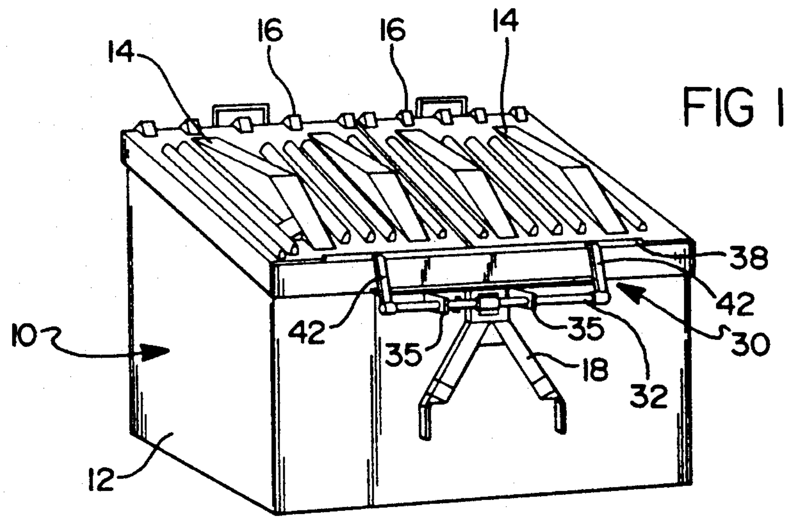
FIG. 1 is a perspective view of a refuse container having a receptacle portion, lid and the locking assembly of the present invention.
Figure 2:
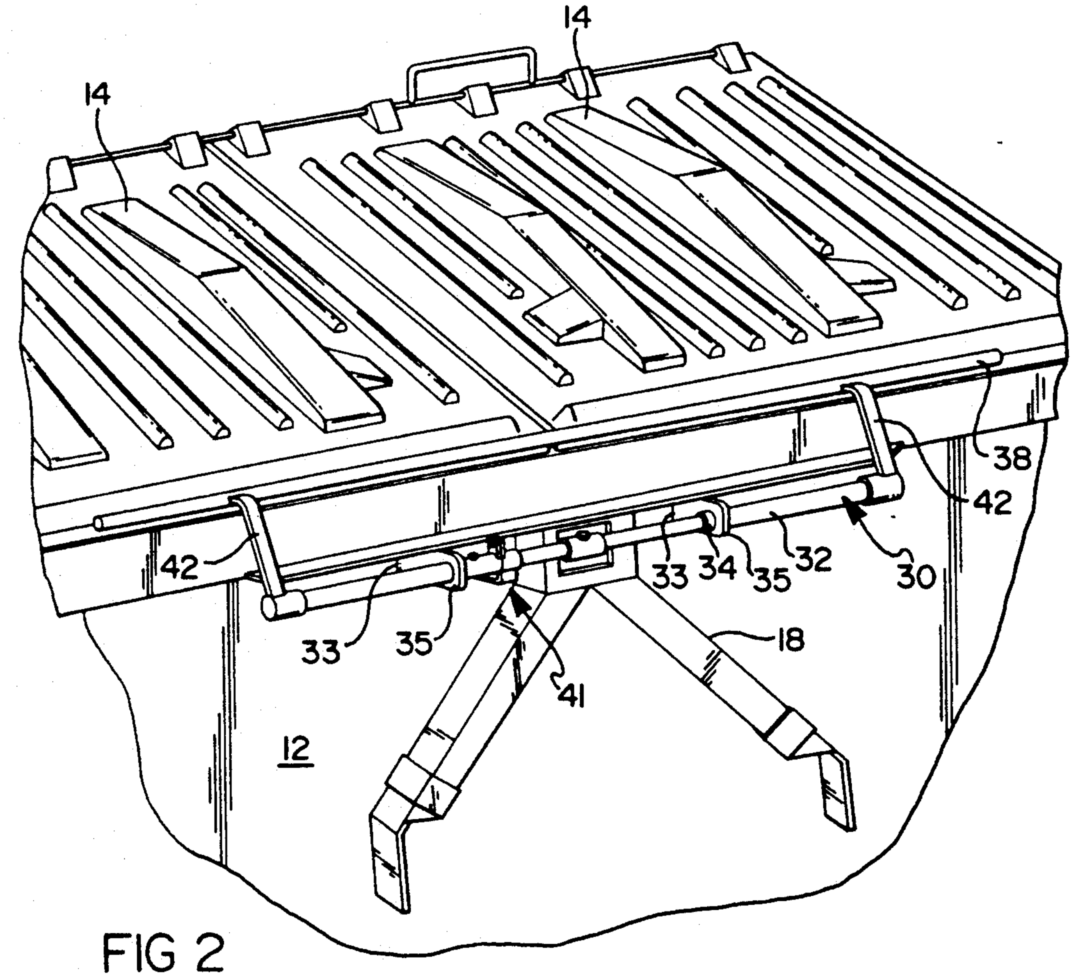
FIG. 2 is a partial perspective view of FIG. 1.

With reference to FIG. 1, a refuse container is shown generally at 10 having a refuse receptacle compartment 12 and lid portions 14. The lids 14 are hinged at 16 to the receptacle 12. The lids illustrated are made of a plastic material as is common with modern refuse containers. The receptacle illustrated uses an A frame receptacle 18. This receptacle is for receipt of a coupler 68, such as for example a triangle attachment, of a refuse collection truck so that the refuse container 10 can be raised and its contents dumped into the collection truck.

The locking assembly of the present invention is shown generally at 30. The locking assembly includes a control bar 32 which is journaled within bearings 34 to the receptacle 10. As illustrated, the bearings are mounted in tabs 35 extending outwardly from the receptacle. These tabs can be welded as at 33 or they may be connected in other known ways such as for example by bolting them to the receptacle.

Figure 5:
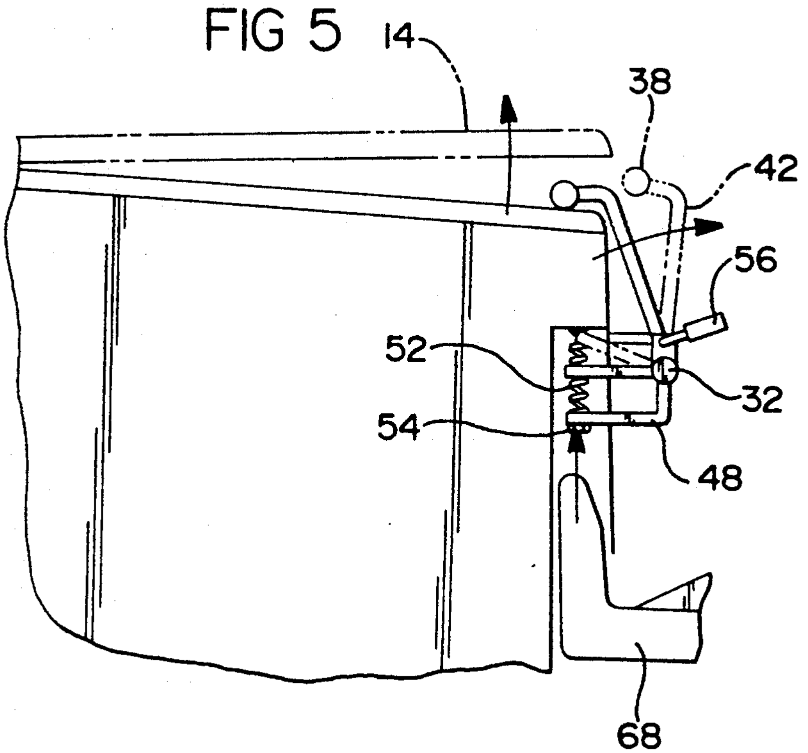
FIG. 5 is a side view of a receptacle container and the locking assembly of the present invention.

A locking bar 38 is connected to the control bar 32 by connecting bars 42 so that the locking bar pivots with control bar 32. The locking bar pivots between first and second positions as illustrated in FIG. 3. In the first position, the locking bar engages the free end of the lids 14 to maintain them in the closed position. In the second position, the locking bar is pivoted away from the lids so that the lids are free to open. The first and second positions of the locking bar are also illustrated in FIG. 5.

A locking fixture is shown generally at 41. Fixture 41 includes a collar or lock member 44 mounted to locking bar 38 so that it rotates with locking bar 38 and a second collar 46 which is mounted so that control bar 32 rotates within collar or lock member 46. With reference to FIG. 4, locking collar 46 is shown in detail and includes an L-shaped bracket 48 that extends outwardly from control bar 32 to a position underneath ledge 50 of the receptacle. A biasing spring 52 is mounted to the end of bracket 48 by a bolt 54. In the preferred embodiment, bolt 54 extends through bracket 48 into ledge 50 where it is fastened with the biasing means 52 encircling bolt 54. Preferably, the spring force of spring 52 is 100 lbs. and all parts of the locking assembly 30 are made of metal.

As shown in FIG. 4, the locking collars 44 and 46 can be locked together with for example, a padlock 56. When collars 44 and 46 are locked together, movement of locking bar 38 requires enough force to overcome the bias of spring 52. When unlocked as shown in FIG. 3, collar 44 is free to move independently of collar 46 and as a result, locking bar 38 is free to move independently of the bias of spring 52.

An engagement tab 60 is mounted to control bar 32 and is adapted to be engaged by the coupler 68 of a refuse truck. As shown in FIG. 4, tab 60 is mounted to control bar 32 by a bolt 62, however other methods of mounting it are within the scope of this invention such as for example by welding it to bar 32. Tab 60 is received within an opening 64 formed in the top of the A frame. In this way, the coupler 68 of a refuse collection truck, when received by the A frame receptacle, will engage tab 60 and pivot control bar 32. If collars 44 and 46 are connected the force of the coupler engaging the tab 60 will pivot locking bar 38 to allow lids 14 to be opened and the refuse container to be dumped. If an authorized user intends to use the refuse container, lock 56 can be removed as shown in FIG. 3 and locking bar 38 freely rotated to permit lids 14 to be opened. If the refuse container is to be dumped by a refuse collection truck and collars 44 and 46 are not locked together, the weight of locking bar 38 will allow it to rotate freely and allow lids 14 to be opened.

Figure 6:
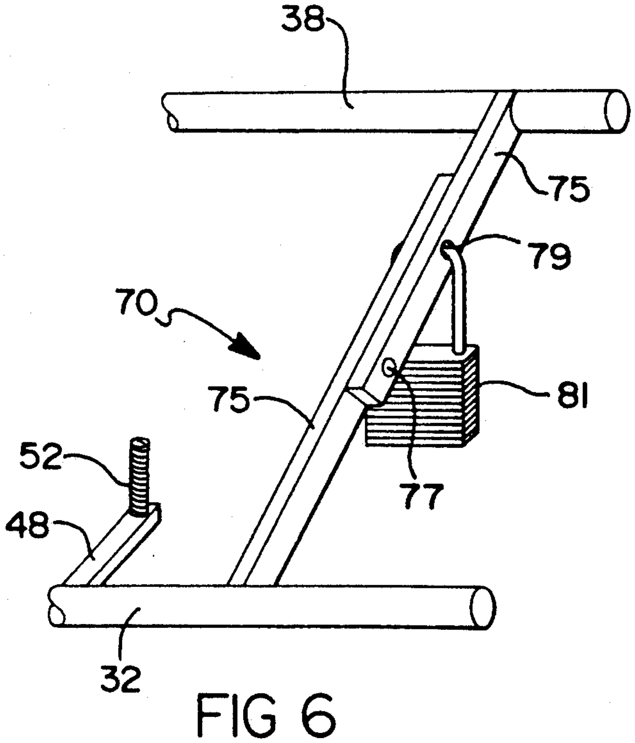
FIG. 6 is a partial view of a second embodiment of the locking assembly of the present invention.

With reference to FIG. 6, a further embodiment of the Present invention is shown generally at 70. In describing this embodiment, the same reference numerals will be used to designate elements that are the same as elements in the previous embodiment. In assembly 70, there is a locking bar 38 coupled to a control bar 32. Both of these bars are shown only partially with it being understood that they extend across the container in a manner similar to those of the first embodiment. Still further, the control bar includes a tab 60 which is not shown in this illustration but is intended to be the same as tab 60 of the previous embodiment.

In assembly 70, the locking and control bars 38 and 32 are connected by articulated connectors 75. There are two connectors 75 extending outwardly from the locking bar 38 in the direction of control bar 32 and two connectors 75 extending outwardly from control bar 32 in the direction of locking bar 38. Only one set of the connectors 75 is illustrated. Each connector extending from the locking bar 38 is pinned at 77 to a respective connector extending from control bar 32 so the locking bar can pivot with respect to the control bar about pins 77. Apertures 79 are formed in at least one set of the pinned connectors 75 to receive a locking means, such as for example a padlock 81.

When an authorized user wants to use the refuse container, the user can remove lock 81 from the articulated connectors 75, rotate the locking bar to free the lid so that it can be opened. When the lock is in place, locking bar 38 is fixed to control bar 38 and can only be moved when enough force is applied to bracket 48 to overcome the spring force of spring 52. Preferably, the spring force is much greater than what an individual could exert, but less than the force of a truck boom when it engages the container. A spring force of 100 lbs. has been found to be acceptable and is preferred.

As can be appreciated by one of ordinary skill in the art, the locking assemblies 30 and 70 of the present invention are very easy to assemble to a refuse container. All that is required is that an opening 64 be cut in the A frame receiver 18. Bracket 48 is then inserted into this opening so that it can be engaged by fork 68 of a refuse collection truck. Mounting brackets 35 are then welded as at 36 or if preferred bolted to the receptacle to mount the locking assembly.

With reference to FIGS. 7 and 8 a preferred embodiment of the locking means of the present invention is illustrated. Briefly, this embodiment employs a different biasing means than disclosed in the previous embodiments and an adjustment means for adjusting the bias of the biasing means. The ability to vary the bias of the biasing means ensures that unauthorized entry is prevented while at the same time ensuring that the container can be automatically opened by a collection truck.

As in the previous embodiment, the locking assembly is shown generally at 30. The locking assembly 30 includes a control bar 32 which is journaled within bearings 34 which are mounted to the receptacle 10. A locking bar 38 as described above is connected to the control bar 32 so that the locking bar pivots with the control bar to prevent unauthorized entry while simultaneously permitting a collection truck to automatically open the container lid so the refuse container can be dumped.

A biasing means 106 is adapted to bias the locking bar 38 against the lid 14 in the first position. The biasing means 106 prevents bar 38 from being pivoted away from the lid by an individual, but can be overcome by the lifting action of a refuse truck. The bias is released by unlocking lock 56 which connects the locking bar 38 to the control bar 32. After the control bar is unlocked, the control bar can be freely rotated. As in the previous embodiment, with the lock 56 locking members 44 and 46 together, the locking bar 38 can only be pivoted away from the lid 14 by a collection truck as the refuse container 10 is being dumped by overcoming the bias of the biasing means 106.

Preferably, the biasing means 106 is a coil spring which is mounted over the control bar 32. One end 108 of the spring 106 is mounted to retaining sleeve 102 and the opposite end 114 of spring 106 is received within an adjustment means 110 to adjust the amount of bias being exerted against the control bar 32. As illustrated, the adjustment means 110 is a cylindrical member that has an opening 112 for receipt of end 114 of spring 106. The opening 112 is offset from the center of the cylinder so that when rotated the amount of bias of the spring 106 against the control bar 32 can be changed. To facilitate rotation of the adjustment means 112 flats 116 are provided.

As should be appreciated by those of ordinary skill in the art, adjustment means 110 cams against the underside of the ledge 118 of refuse container 10 to adjust the bias of the spring 106 to make it easier or harder to pivot control bar 32. Rotating the cylinder 110 causes the distance between the end 114 of spring 106 and the ledge 118 to change. As the distance increases, the bias of spring 106 is increased and as the distance is decreased the bias of spring 106 decreases.

As in the previous embodiments, locking bar 38 is selectively coupled to control bar 32 so that when coupled the bias of spring 106 acts upon locking bar 38 and when uncoupled, the locking bar 38 is free to pivot with respect to refuse container 10 and lid 14. In this embodiment, retaining sleeve 102 is mounted to container 10 by a bracket 104 which fixes sleeve 102 with respect to container 10. Control bar 32 journals within sleeve 102. Extending outwardly from sleeve 102 is locking member 46 which is adjacent locking member 44. When connected by for example a padlock 56, the locking bar 38 is biased by spring 106. When not connected. locking bar 38 is free to journal within sleeve 102 and bearings 34.

It is to be understood that the embodiment described herein is merely illustrative of the general principals of the invention. Numerous variations and modifications may be made by those skilled in the art. For example, locking bar 38 could be mounted to the control bar 32 by a collar that permits the locking bar to rotate with respect to the control bar unless it is connected to a second collar fixed to the control bar. Again, the second collar would be connected to a biasing means. Further, the biasing means could be integral with bracket 48 obviating the need for the second collar in the second embodiment. Still further, the assembly could be modified to fit on sleeve containers that use pockets along the side of the container for receipt of the truck forks instead of an A-frame receptacle. In this later modification, the bracket 60 would have to extend into the pocket. Other modifications will be apparent to those of ordinary skill in the art. The present invention is not to be limited to the particular forms herein shown and described except insofar as indicated by the scope of the following claims.

We claim:

1. A lock for use on a refuse container, the refuse container having a receptacle portion and a lid covering the receptacle portion. said lock comprising:

a locking bar and control bar mounted to said refuse container such that said locking bar and control bar are adapted to pivot with respect to said container, said locking bar being pivotal about an axis between a first position wherein said locking bar engages said lid of said refuse container and a second position wherein said locking bar is clear of said lid and said lid is free to open;

a biasing means mounted to said control bar for selectively biasing said locking bar to said first position;

a coupling means for selectively coupling said locking bar and said biasing means such that when coupled, movement of said locking bar requires sufficient force to overcome said biasing means and when not coupled said locking bar can move independently of said biasing means;

a slot adapted to receive a boom from a refuse collection truck;

engagement means for engagement by a refuse collection truck boom, said engagement means being interconnected to said control bar, said engagement means being positioned vertically above said slot, said engagement means and said slot extending for a smaller axial distance than said locking bar;

whereby said refuse container can be locked by said coupling means such that movement of said locking bar to said second position to open said lid requires sufficient force to overcome said biasing means and said refuse container can be unlocked and opened without overcoming the force of said biasing means by uncoupling said coupling means.

2. The lock assembly of claim 1, wherein said biasing means is a spring mounted to said refuse container.

3. The lock assembly of claim 1, wherein said control bar and said locking bar are connected by connecting bars.

4. The lock assembly of claim 3, wherein said coupling means includes a first collar fixed to said control bar and a second adjacent collar rotatably mounted to said control bar, said second adjacent collar being spring biased and both said collars being adapted to be locked together by lock means.

5. The lock assembly of claim 3, wherein said connecting bars are articulated such that said locking bar is adapted to pivot independently of said control bar, said connecting bars including lock means for locking said connecting bars together such that said locking bar pivots with said control bar.

6. The lock assembly of claim 1, wherein said biasing means is adjustable.

7. The lock assembly of claim 1, wherein said slot and said engagement means are positioned adjacent an axial center of said locking bar.

8. The lock assembly of claim 6, wherein there is one slot, and one engagement means.

9. An improved refuse container having a container with a lid thereon for use in storing refuse until collected by a collection truck, said improved refuse container comprising:

a locking means operatively connected to the lid of said container to prevent unauthorized entry to said refuse container while simultaneously allowing a collection truck to automatically open said lid such that said refuse container can be dumped into said collection truck and allowing an authorized user to open said lid;

said locking means including a pivotal locking bar that is adapted to pivot to a first position wherein it engages said lid to prevent said lid from being opened and a second position wherein it is disengaged from said lid so that said lid can be opened, biasing means selectively biasing said locking means against said lid in said first position, said biasing means being releasable from said locking bar by an authorized user so that said refuse container can be opened, and by a collection truck as said refuse container is being dumped by overcoming the bias of said biasing means;

adjustment means operatively connected to said biasing means to adjust the amount of bias against said locking means;

whereby said refuse container can be opened by an authorized used by releasing said biasing means from said locking means, and by a collection truck as said refuse container is being dumped by overcoming said biasing means but cannot be opened by an authorized user due to the bias of said biasing means against said locking bar; and said biasing means is a coil spring received upon a control bar, said locking bar being selectively coupled to said control bar such that when coupled the bias of said coil spring acts upon said locking bar and when uncoupled, the locking bar is free to pivot with respect to said refuse container lid.

10. The refuse container of claim 9, wherein said adjustment means includes a cam means connected to said biasing means whereby rotation of said cam means adjusts the amount of bias of said biasing means against said locking bar.

11. An improved refuse container having a container with a lid thereon for use in storing refuse until collected by a collection truck, said improved refuse container comprising:

a locking means operatively connected to the lid of said container to prevent unauthorized entry to said refuse container while simultaneously allowing a collection truck to automatically open said lid such that said refuse container can be dumped into said collection truck and allowing an authorized user to open said lid;

said locking means including a pivotal locking bar that is adapted to pivot to a first position wherein it engages said lid to prevent said lid from being opened and a second position wherein it is disengaged from said lid so that said lid can be opened, biasing means selectively biasing said locking means against said lid in said first position, said biasing means being releasable from said locking bar by an authorized user so that said refuse container can be opened, and by a collection truck as said refuse container is being dumped by overcoming the bias of said biasing means;

adjustment means operatively connected to said biasing means to adjust the amount of bias against said locking means;

whereby said refuse container can be opened by an authorized user by releasing said biasing means from said locking means, and by a collection truck as said refuse container is being dumped by overcoming said biasing means but cannot be opened by an authorized user due to the bias of said biasing means against said locking bar;

said adjustment means includes a cam means connected to said biasing means whereby rotation of said cam means adjusts the amount of bias of said biasing means against said locking bar; and said cam means is mounted upon one end of said biasing means and cams against said refuse container to adjust the bias of said biasing means against said locking bar.

12. The refuse container of claim 9, wherein said adjustment means includes a cam means connected to said biasing means whereby rotation of said cam means adjusts the amount of bias of said biasing means against said locking bar;

said cam means being threaded upon one end of said biasing means and camming against said refuse container to adjust the bias of said biasing means against said locking bar; and said biasing means being a coil spring received upon a control bar, said locking bar being selectively coupled to said control bar such that when coupled the bias of said coil spring acts upon said locking bar and when uncoupled, the locking bar is free to pivot with respect to said refuse container lid.

* * * * *

UNITED STATES PATENT AND TRADEMARK OFFICE

CERTIFICATE OF CORRECTION

PATENT NO. : 5,224,743

DATED : July 6, 1993

INVENTOR(S) : Steven Dawdy and Peter J. Rosewig, Jr.

It is certified that error appears in the above-identified patent and that said Letters Patent is hereby corrected as shown below:

Column 8, line 43, "used" should be --user--.

Signed and Sealed this

Twenty-sixth Day of April, 1994

Attest:

BRUCE LEHMAN

*Attesting Officer* *Commissioner of Patents and Trademarks*